(12) United States Patent
Lu

(10) Patent No.: US 7,950,615 B2
(45) Date of Patent: May 31, 2011

(54) PRESS-FIT EXTENDABLE SUPPORT ROD

(76) Inventor: Jung-Wen Lu, Dali (TW)

(*) Notice: Subject to any disclaimer, the term of this patent is extended or adjusted under 35 U.S.C. 154(b) by 260 days.

(21) Appl. No.: 12/413,718

(22) Filed: Mar. 30, 2009

(65) Prior Publication Data

US 2010/0243838 A1    Sep. 30, 2010

(51) Int. Cl.
*A47F 5/00* (2006.01)
(52) U.S. Cl. ............... 248/354.1; 248/251; 248/157; 248/176.3; 248/188.2; 248/188.5; 254/112; 254/119; 410/143; 410/145; 410/151; 74/163; 52/127.2; 403/322.4
(58) Field of Classification Search ............ 403/321, 403/326, 322.4; 52/127.1, 127.2; 254/112, 254/119; 74/167, 141.5, 163; 410/153, 151, 410/143, 145; 226/152; 248/351, 354.1, 248/157, 423, 176.1, 176.3, 188.1, 188.2, 248/188.5, 188.91, 220.21, 220.22, 221.11, 248/222.13
See application file for complete search history.

(56) References Cited

U.S. PATENT DOCUMENTS

| | | | | |
|---|---|---|---|---|
| 5,890,856 A | * | 4/1999 | Huang | 410/151 |
| 6,062,782 A | * | 5/2000 | Huang | 410/151 |
| 6,247,882 B1 | * | 6/2001 | Huang | 410/151 |
| 7,374,380 B2 | * | 5/2008 | Huang | 410/151 |
| 2007/0164184 A1 | * | 7/2007 | Xammar Bove | 248/354.1 |

* cited by examiner

*Primary Examiner* — Terrell Mckinnon
*Assistant Examiner* — Todd M. Epps
(74) *Attorney, Agent, or Firm* — Wang Law Firm, Inc.; Li K. Wang

(57) ABSTRACT

A press-fit extendable support rod includes an outer pipe and an inner pipe sheatheable along the outer pipe. An end of a rope is fixed to the inner pipe, and another end of the rope is extendable outward. A press-fit buckle device is sheathed to a joint of the inner and outer pipes. A rotary arm is pivotally coupled to the press-fit buckle device, and an end of the rotary arm has a first operating portion, a second operating portion and a third operating portion. The rotary arm can be pivotally coupled to the press-fit buckle device by one of the operating portions, and another end of the rope is wound onto each operating portion. When the rotary arm is turned, the rope is pulled, turned around, and pressed at each operating portion, and the length of the inner pipe extended out of the outer pipe is adjusted and fixed.

8 Claims, 14 Drawing Sheets

PRESS-FIT EXTENDABLE SUPPORT ROD

BACKGROUND OF THE INVENTION

1. Field of the Invention

The present invention relates to a support rod structure, in particular to a press-fit extendable support rod.

2. Description of the Related Art

With reference to FIGS. 13 and 14 for a structure of a conventional support rod 8, the conventional support rod includes an inner bushing 81 and an external bushing 82. A supporting portion 83 is disposed individually at both ends of the support rod 8, a base 9 with an opening disposed at a joint position of the external bushing 82 and the inner bushing 81, and two locking plates 91 are extended radially from the bottom of the base 9 for fixing the external bushing 82. A handle 94 is pivotally coupled to the base 9, and a latch 92 is disposed at a front end of the handle 94, and a plurality of serrations 93 are formed at an end of the latch 92, such that the handle 94 can be pressed down to push each serration 93 into a latch hole 811 of the inner bushing 81 to adjust the extended length of the inner bushing 81.

In the whole process of adjusting the inner bushing 81, a front end of a grabbling hook 951 of a pawl 95 is abutted by a torsion spring 96, so that the grabbling hook 951 can be embedded into the latch hole 811 at an external periphery of the inner bushing 81 to maintain the position of the inner bushing 81 and prevent the inner bushing 81 from falling down.

In general, the grabbling hook 951 can be embedded into the latch hole 811 to achieve the positioning effect after the support rod 8 is adjusted to an appropriate length. However, this structural design of the support rod requires manufacturing the latch holes 811 in the manufacturing process of the inner bushing 81, and thus incurs a higher manufacturing cost. With the consideration of the deformation of the latch holes 811, it is difficult to enhance the rigidity by thermal treatment. Undoubtedly, the strength of the support rod is poor, and the grabbling hook 951 has to bear the acting forces coming from both ends of the support rod 8, and thus the grabbling hook 951 will be damaged frequently by the load. Obviously, the structure of the conventional support rod 8 has a disadvantage on life expectancy.

In the whole process of adjusting the extended length of the inner bushing 81, the serrations 93 of the latch 92 and the latch holes 811 are engaged with each other, and thus a fine-tune adjustment cannot be made since the length adjustment is limited by the teeth spacing. Particularly, such support rod 8 is used frequently for fixing goods in a container truck, but a fine-tune adjustment cannot be made and a small gap may be formed, so that the goods may get loosened or even fall down easily by the shaking forces occurred during transportations. This fine-tune adjustment issue creates tremendous troubles to users.

SUMMARY OF THE INVENTION

Therefore, it is a primary objective of the present invention to provide a press-fit extendable support rod capable of making a fine-tune adjustment of the length of the support rod.

Another objective of the present invention is to provide a press-fit extendable support rod without manufacturing additional latch holes on an inner pipe, so as to achieve the effects of lowering the manufacturing cost, enhancing the strength of the support rod by thermal treatments, and reducing the damage rate of the support rod.

A further objective of the present invention is to provide a press-fit extendable support rod capable of absorbing forces produced by shaking during transportations by making use of the tension of the rope to provide a shock absorbing effect.

To achieve the foregoing objectives, the present invention provides a press-fit extendable support rod, comprising:

a support rod, composed of an outer pipe and an inner pipe slidably sheathed along the outer pipe, wherein a containing space is formed between the outer pipe and the inner pipe, and the inner pipe has a fixing portion disposed inside the containing space, and a rope has an end fixed to the fixing portion and another end passed through the containing space and extended towards an external side of the support rod, and a supporting portion is disposed individually on both ends of the support rod; and a press-fit buckle device, sheathed to a joint position of the outer pipe and the inner pipe, and having two opposite sidewalls, and a rotary arm installed between the two sidewalls, wherein the rotary arm includes a pivotal connecting end and a turning end disposed opposite to the pivotal connecting end, and the pivotal connecting end includes a first operating portion, a second operating portion and a third operating portion, and the rotary arm is pivotally coupled between the two sidewalls by using one of the operating portions as an axis, and has a gap between the second operating portion and the third operating portion, and another end of the rope is wound onto the first operating portion and the second operating portion and then passed through the gap between the second operating portion and the third operating portion, such that when the rotary arm is turned, the rope is pulled, turned around, and pressed at each operating portion to fix the inner pipe at a corresponding position of the outer pipe.

DETAILED DESCRIPTION OF THE PREFERRED EMBODIMENTS

Figure 1:
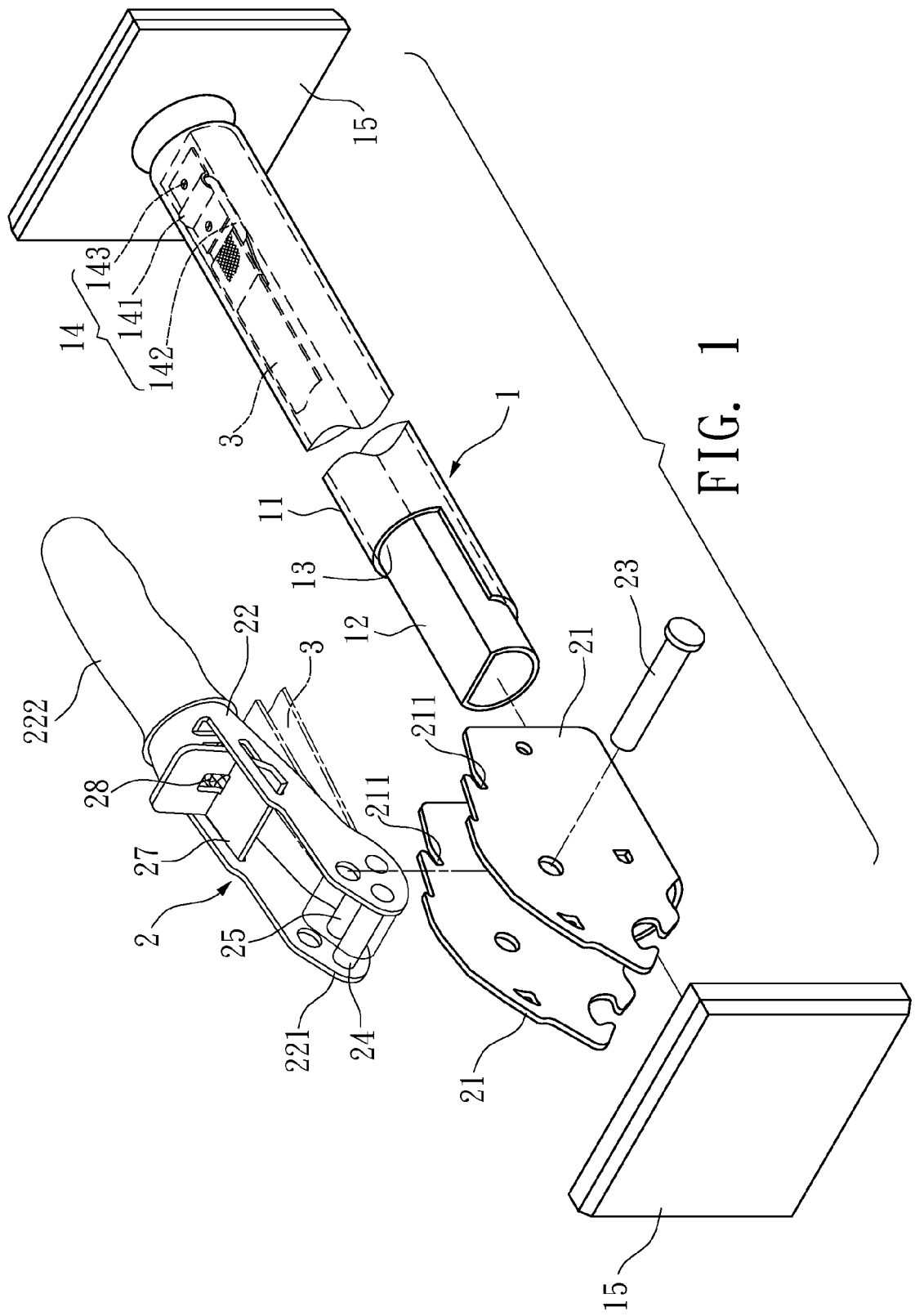
FIG. 1 is an exploded view of the present invention.
Figure 2:
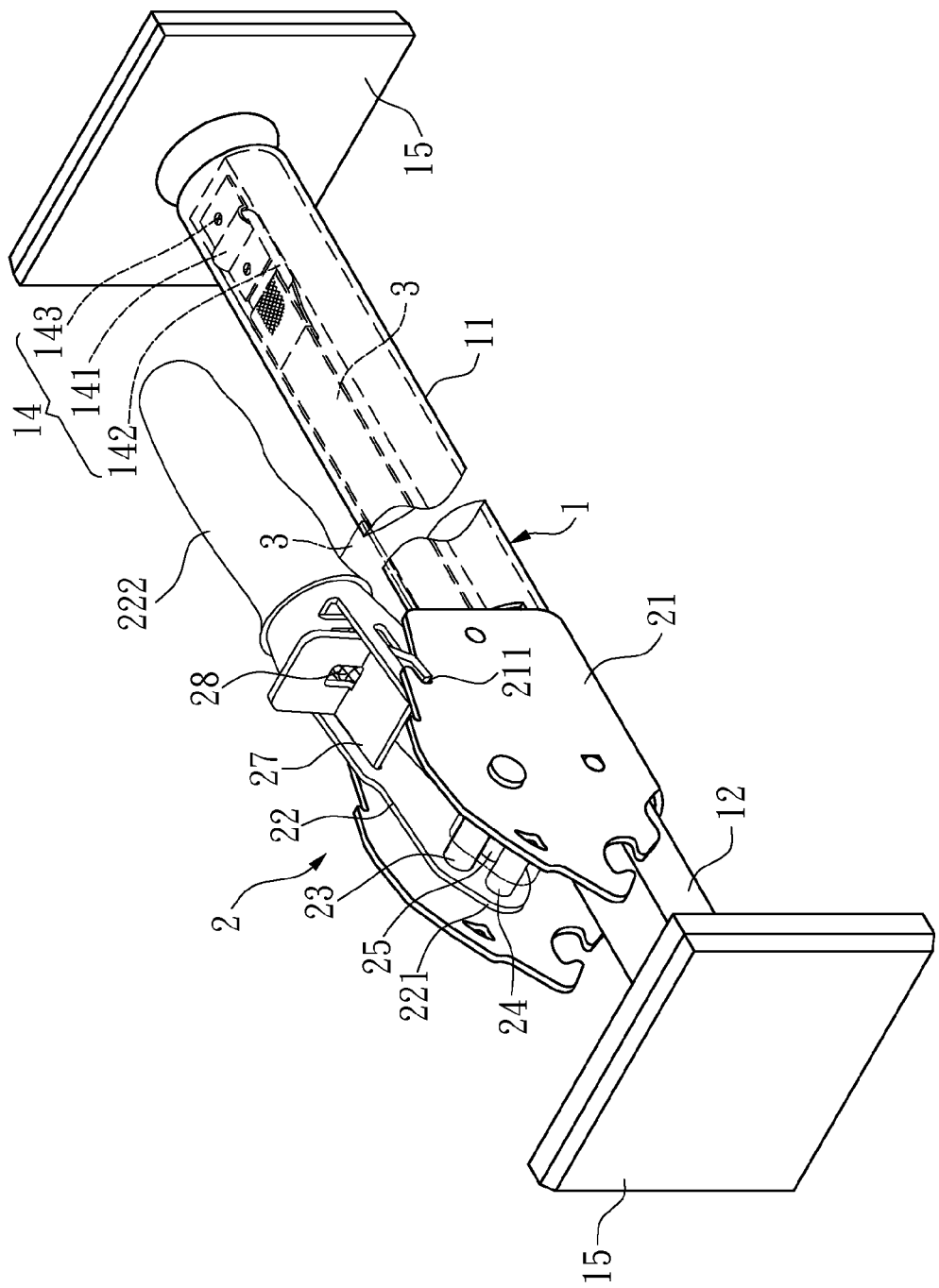
FIG. 2 is a perspective view of an assembly of the present invention.

With reference to FIGS. 1 to 5 for a press-fit extendable support rod in accordance with a first preferred embodiment of the present invention, the press-fit extendable support rod comprises a support rod 1 and a press-fit buckle device 2, wherein the support rod 1 is composed of an outer pipe 11 and an inner pipe 12 slidably sheathed into the outer pipe 11. In this preferred embodiment, the outer pipe 11 has a cross-section substantially in a circular shape, and the inner pipe 12 has a cross-section substantially in a semicircular shape, such that when the inner pipe 12 is sheathed into the outer pipe 11, a containing space 13 is formed between the outer pipe 11 and the inner pipe 12, and the inner pipe 12 includes a fixing portion 14 disposed inside the containing space 13, and the fixing portion 14 is fixed to a fixing ring 142 by a fixing plate 141, and a plurality of screws 143 are provided for securing the fixing plate 141 onto the inner pipe 12. Of course, users can connect the fixing ring 142 to the inner pipe 12 by welding or any other method. An end of rope 3 is passed through the fixing ring 142 on an external side of the inner pipe 12, such that an end of the rope 3 is fixed onto the fixing ring 142, and another end of the rope 3 is passed through the containing space 13 and extended towards an external side of the support rod 1, and of course, the rope 3 can be replaced by a steel wire, a string or a cable. In addition, a supporting portion 15 is disposed individually on both ends of the support rod 1.

The press-fit buckle device 2 is sheathed to a joint of the outer pipe 11 and the inner pipe 12, and the press-fit buckle device 2 has two opposite sidewalls 21, and a rotary arm 22 pivotally coupled between the two sidewalls 21, wherein the rotary arm 22 includes a pivotal connecting end 221 and a turning end 222 disposed at a position opposite to the pivotal connecting end 221. The pivotal connecting end 221 has a first operating portion 23, a second operating portion 24 and a third operating portion 25, wherein the second operating portion 24 is disposed at a front end proximate to the pivotal connecting end 221, and the operating portions 23, 24, 25 are arranged in a triangle. In this preferred embodiment, the rotary arm 22 is pivotally coupled between the two sidewalls 21 by using the first operating portion 23 as an axis, and has a gap 26 between the second operating portion 24 and the third operating portion 25, and another end of the rope 3 is wound onto the first operating portion 23 and the second operating portion 24, and then passed through the gap 26 between the second operating portion 24 and the third operating portion 25. An end of the rope 3 is fixed to the fixing portion 14 of the inner pipe 12, such that the rope 3 can drive the inner pipe 12 to slide along the outer pipe 11 for making a length adjustment.

The press-fit buckle device 2 further includes an embedding notch 211 disposed individually on two opposite sidewalls 21, and a handle 27 slidably installed between the pivotal connecting end 221 and the turning end 222 of the rotary arm 22, wherein the handle 27 is pressed by a resilient element 28 and embedded into the embedding notches 211 of the two sidewalls 21 of the press-fit buckle device 2 for fixing the rotary arm 22 after the rotary arm 22 is turned.

Figure 3:
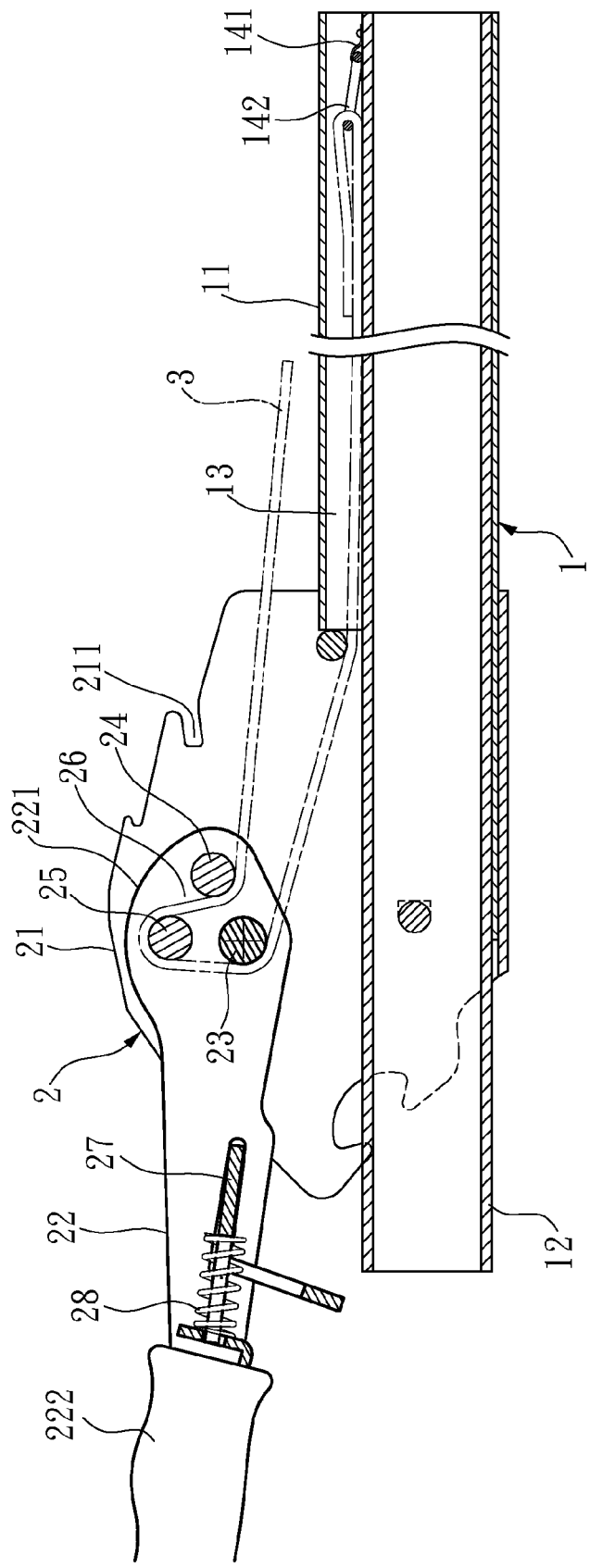
FIG. 3 is a cross-sectional view of an assembly of the present invention.

If the present invention with the foregoing installed components is used in a practical application, and the rotary arm 22 has not been turned yet as shown in FIG. 3, then the rope 3 will not be fixed by the press-fit buckle device 2, and thus the rope 3 is in a movably adjustable status. When a user pulls the rope 3 towards the support rod 1 to extend the inner pipe 12 towards an external end, the extended length of the inner pipe 12 can be adjusted. Of course, the user can also apply a force directly to the inner pipe 12 to adjust the extended length of the inner pipe 12.

Figure 4:
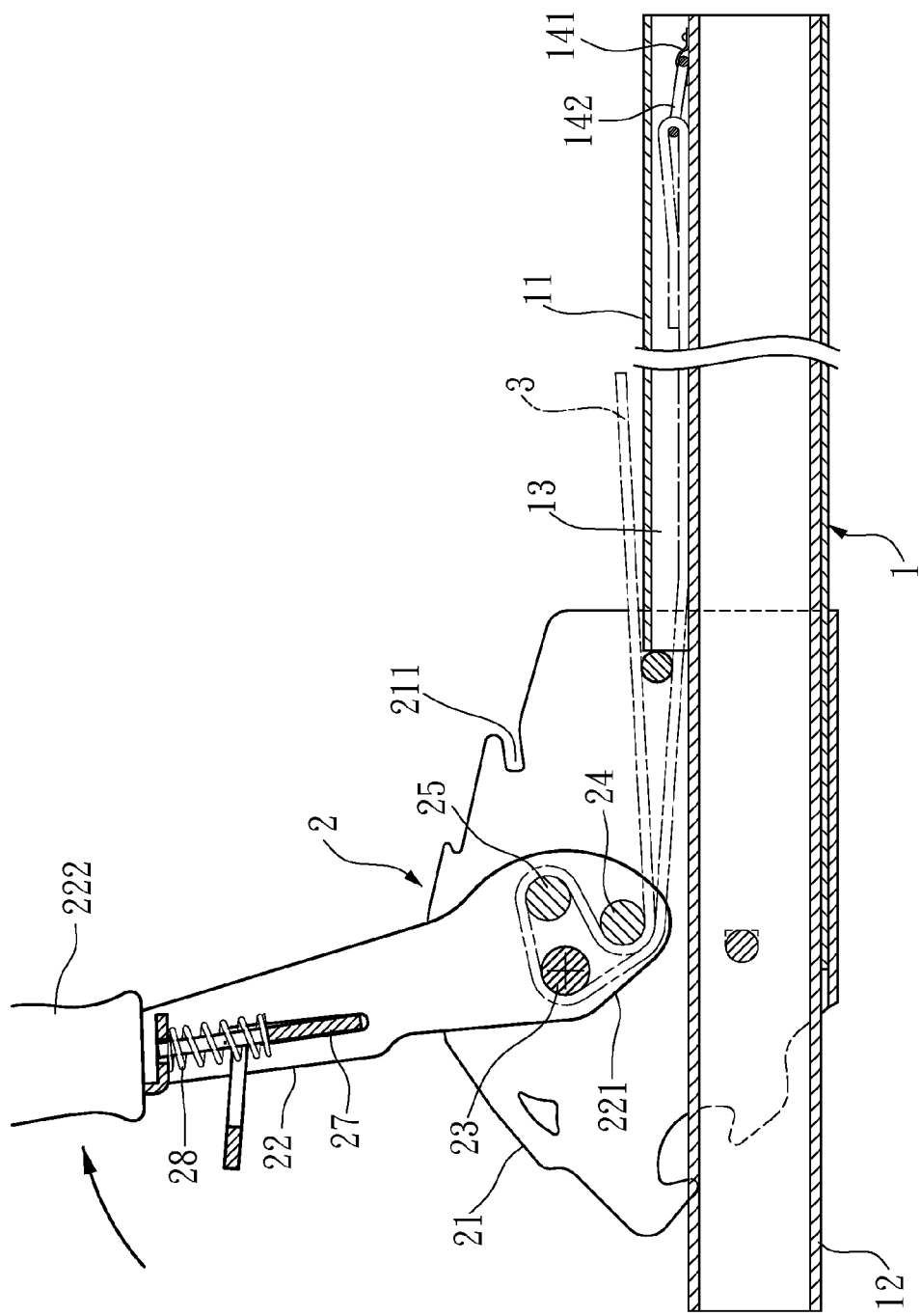
FIG. 4 is a schematic view of an application status, showing that a rotary arm is turned to 90° in accordance with the present invention.

After the inner pipe 12 is adjusted to a predetermined length, users can apply a force to the turning end 222 of the rotary arm 22 to turn the rotary arm 22. When the rotary arm 22 is rotated to 90 degrees as shown in FIG. 4, the rope 3 will be pulled and turned around each operating portion 23, 24, 25, such that the rope 3 wound around each operating portion 23, 24, 25 will have a pulling force imposed, and such pulling force produces a friction between the rope 3 and each operating portion 23, 24, 25, and winds the rope 3 onto the second operating portion 24 and the third operating portion 25, and an overlap of the rope 3 in a press-fit state will occur at a position adjacent to the second operating portion 24 and the third operating portion 25, and the resistance produced by the alternately moving rope 3 will give rise to a press-fit effect to the rope 3.

Figure 5:
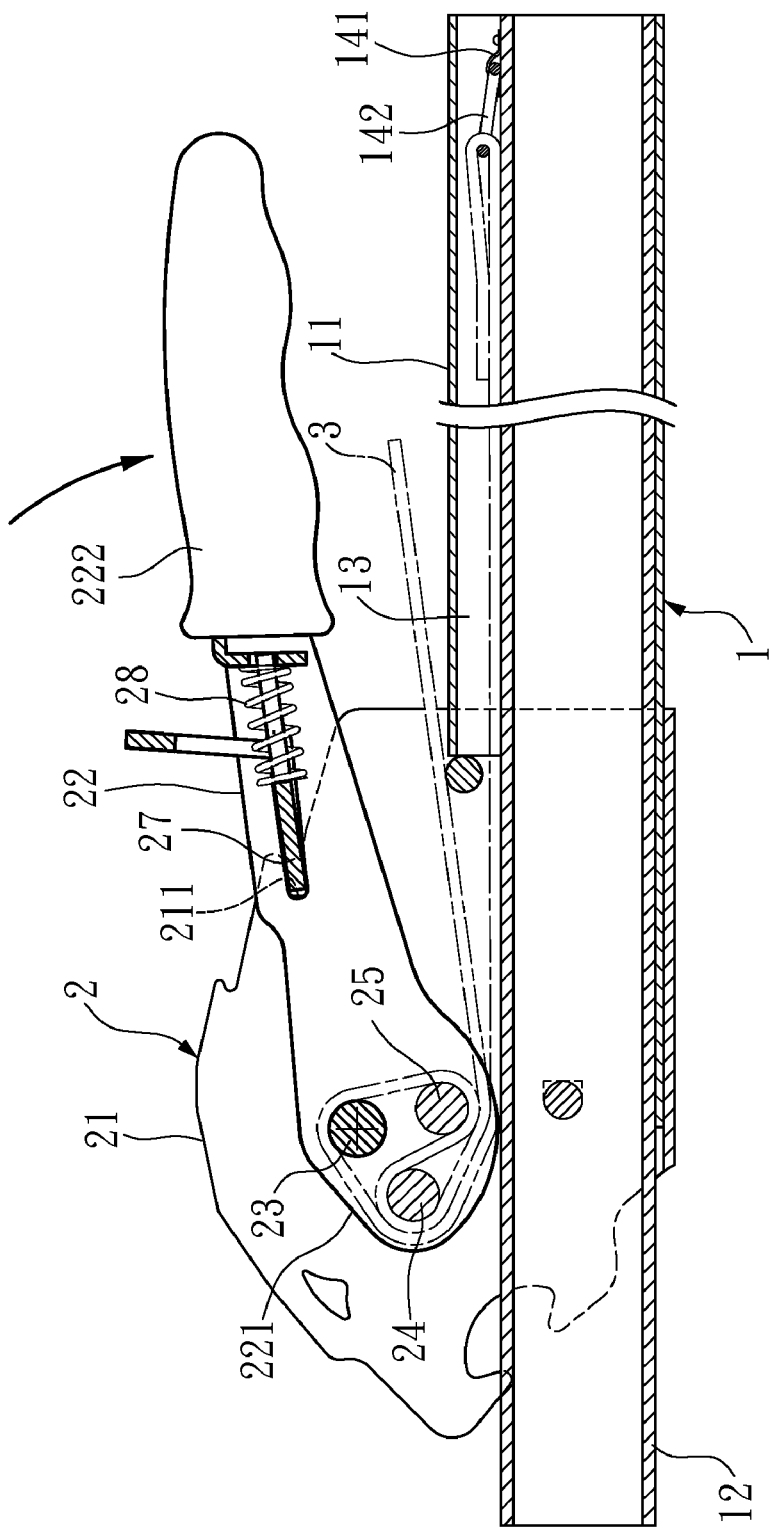
FIG. 5 is a schematic view of an application status, showing that a rotary arm is turned till a handle can be embedded into an embedding notch of a press-fit buckle device in accordance with the present invention.

If users continue turning the rotary arm 22 as shown in FIG. 5, the rope 3 will be situated at a tensed state, and thus the continuously turned rotary arm 22 will embed the handle 27 of the rotary arm 22 into the embedding notches 211 on both sides of the press-fit buckle device 2 to position the rotary arm 22 after the rotary arm 22 is turned. The rope 3 is pulled by each operating portion 23, 24, 25 to drive the inner pipe 12 to be extended, so as to effectively reduce the gap from the supporting portions 15 at both ends of the prop rod 1 to a supported object to give a secured supporting effect. The rope 3 has a tension that provides an effect of absorbing forces acted on the supporting portion 15 to effectively reduce the gap produced by the displacement of the goods of support rods during the transportation process, and greatly improve the situation of loosening or dropping goods during transportation.

The manufacturing procedure of the inner pipe 12 of the invention no longer needs the latch holes anymore, and thus the invention can simplify the manufacture of the inner pipe 12 significantly, and the support rod 1 of the invention no longer bears the force applied by a single grabbling hook and acted onto both ends of the support rod 1, and thus the invention can lower the damage rate of the support rod 1 and extend the life expectancy of the support rod 1. In addition, the length of the inner pipe 12 extended from the outer pipe 11 of the support rod 1 of the invention can be adjusted by pulling the rope 3 to achieve a fine-tune adjustment of the length of the support rod 1.

Figure 6:
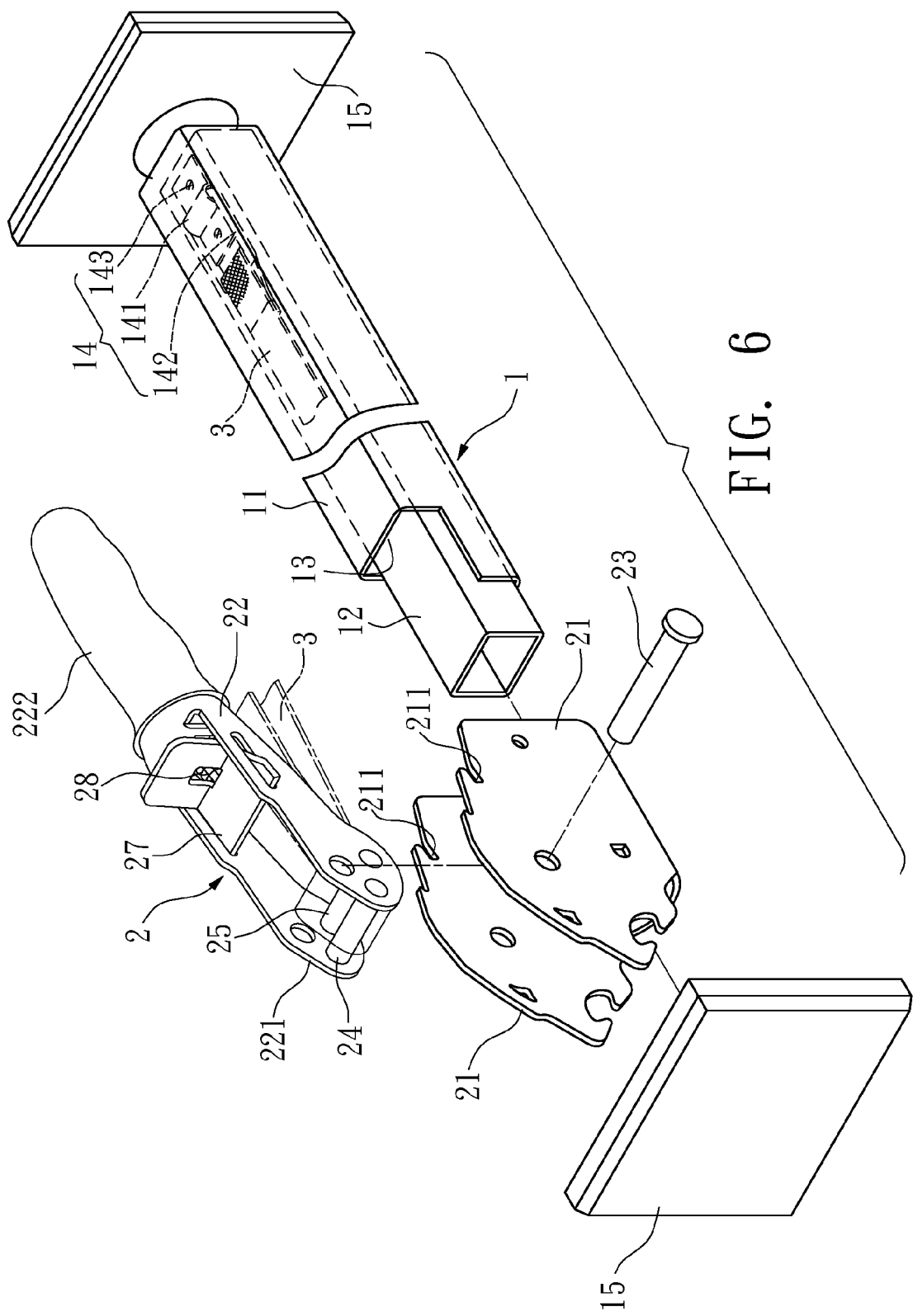
FIG. 6 is a perspective exploded view of a structure in accordance with a second preferred embodiment of the present invention.

In the first preferred embodiment, the outer pipe 11 has a cross-section substantially in a circular shape, and the inner pipe 12 has a cross-section substantially in a semicircular shape, such that when the inner pipe 12 is sheathed into the outer pipe 11, the rope 3 can be passed through the containing space 13. With reference to FIG. 6 for a second preferred embodiment of the present invention, the cross-sections of the inner pipe 12 and the outer pipe 11 can be changed to a rectangular shape giving a smaller internal diameter of the inner pipe 1 to go with a rectangular shape giving a larger internal diameter of the outer pipe 11, such that when the inner pipe 12 is sheathed into the outer pipe 11, the containing space 13 is formed naturally. Regardless of the cross-sectional shape including a square shape, a triangular or a polygonal shape of the inner pipe 12 and the outer pipe 11, the containing space 13 is formed as long as the inner pipe 12 can be sheathed into the outer pipe 11. Therefore, all of these shapes can be used in a preferred embodiment with the equivalent effects.

Figure 7:
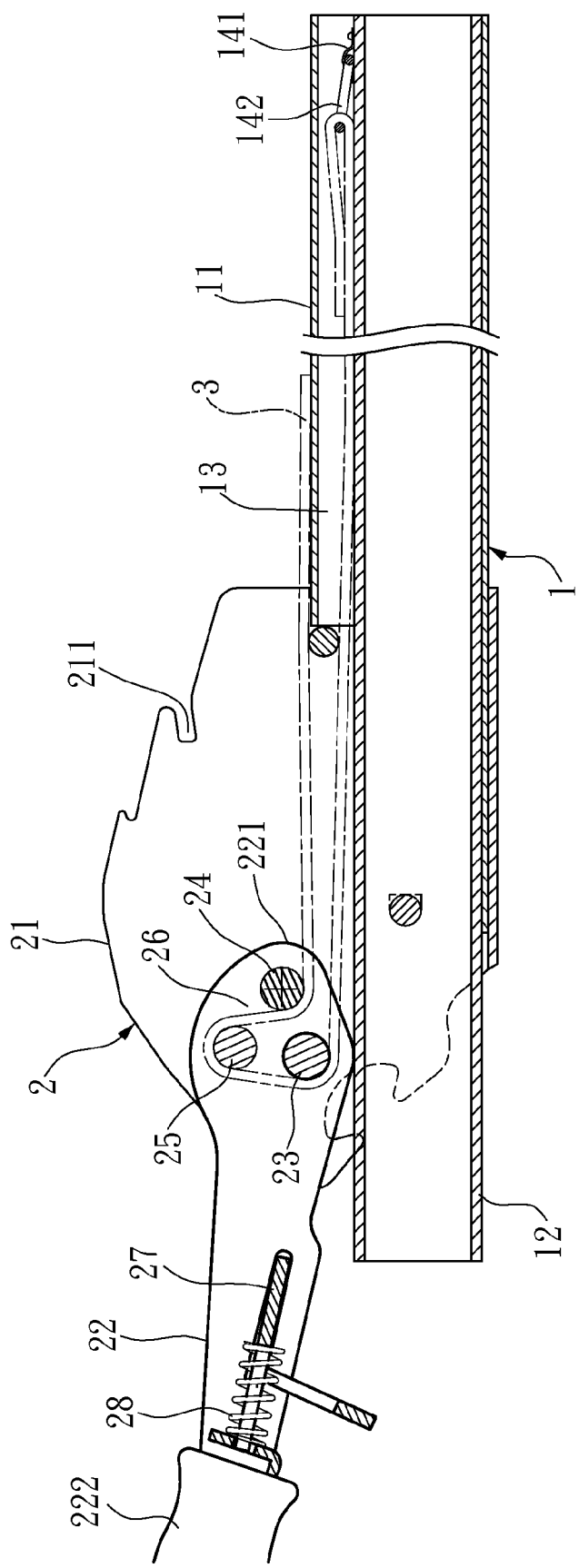
FIG. 7 is a schematic view of a structure, showing the status that a rotary arm has not been turned yet in accordance with a third preferred embodiment of the present invention.
Figure 8:
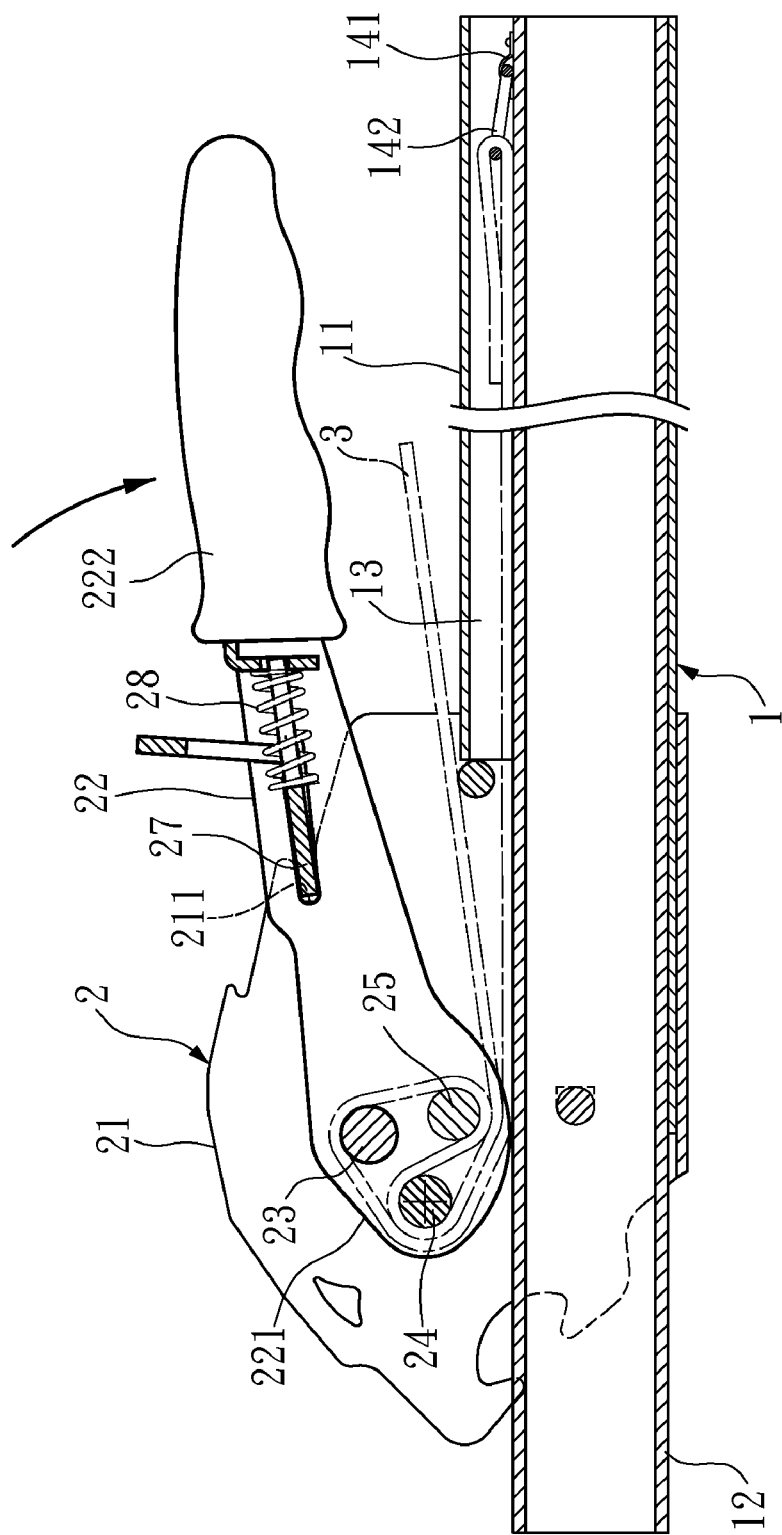
FIG. 8 is a schematic view of an application status, showing the status that a rotary arm is turned till a handle can be embedded into an embedding notch of a press-fit buckle in accordance with a third preferred embodiment of the present invention.

Of course, the present invention has other embodiments. With reference to FIGS. 7 and 8 for a third preferred embodiment of the present invention, the difference between this embodiment and the first preferred embodiment resides on that the rotary arm 22 is pivotally coupled between two sidewalls 21 of the press-fit buckle device 2 by using the second operating portion 24 as an axis. If the rotary arm 22 has not been turned yet, the rope 3 will not be fixed or turned by the press-fit buckle device 2 as shown in FIG. 7. Now, a user can pull the rope 3 towards an external side of the support rod 1 to adjust the extended length of the inner pipe 12. If the user turns the rotary arm 22, the handle 27 of the rotary arm 22 can be embedded into the embedding notches 211 on both sides of the press-fit buckle device 2 to position the rotary arm 22 after the rotary arm 22 is turned. In FIG. 8, the rope 3 is pulled and turned around the first operating portion 23 and the third operating portion 25 to form an overlap of the rope 3 in a press-fit state at a position adjacent to the second operating portion 24 and the third operating portion 25, so as to achieve a similar effect of the aforementioned first preferred embodiment.

Figure 9:
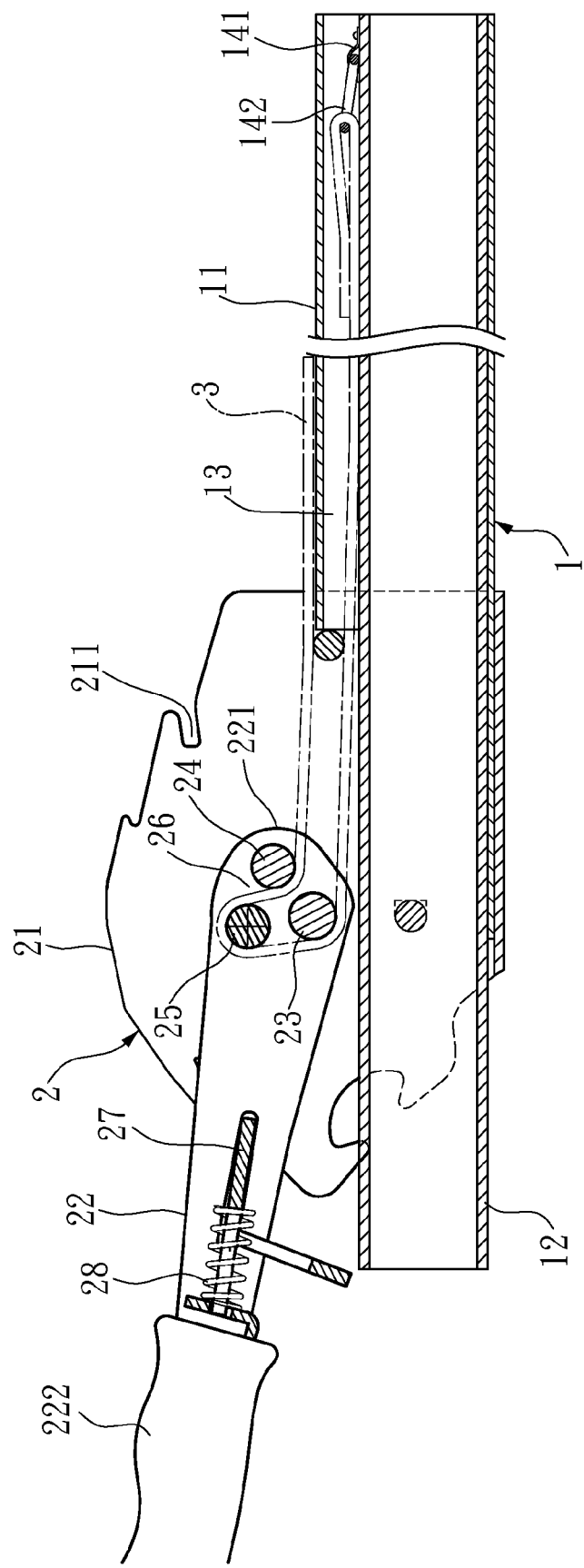
FIG. 9 is a schematic view of a structure, showing the status that a rotary arm has not been turned yet in accordance with a fourth preferred embodiment of the present invention.
Figure 10:
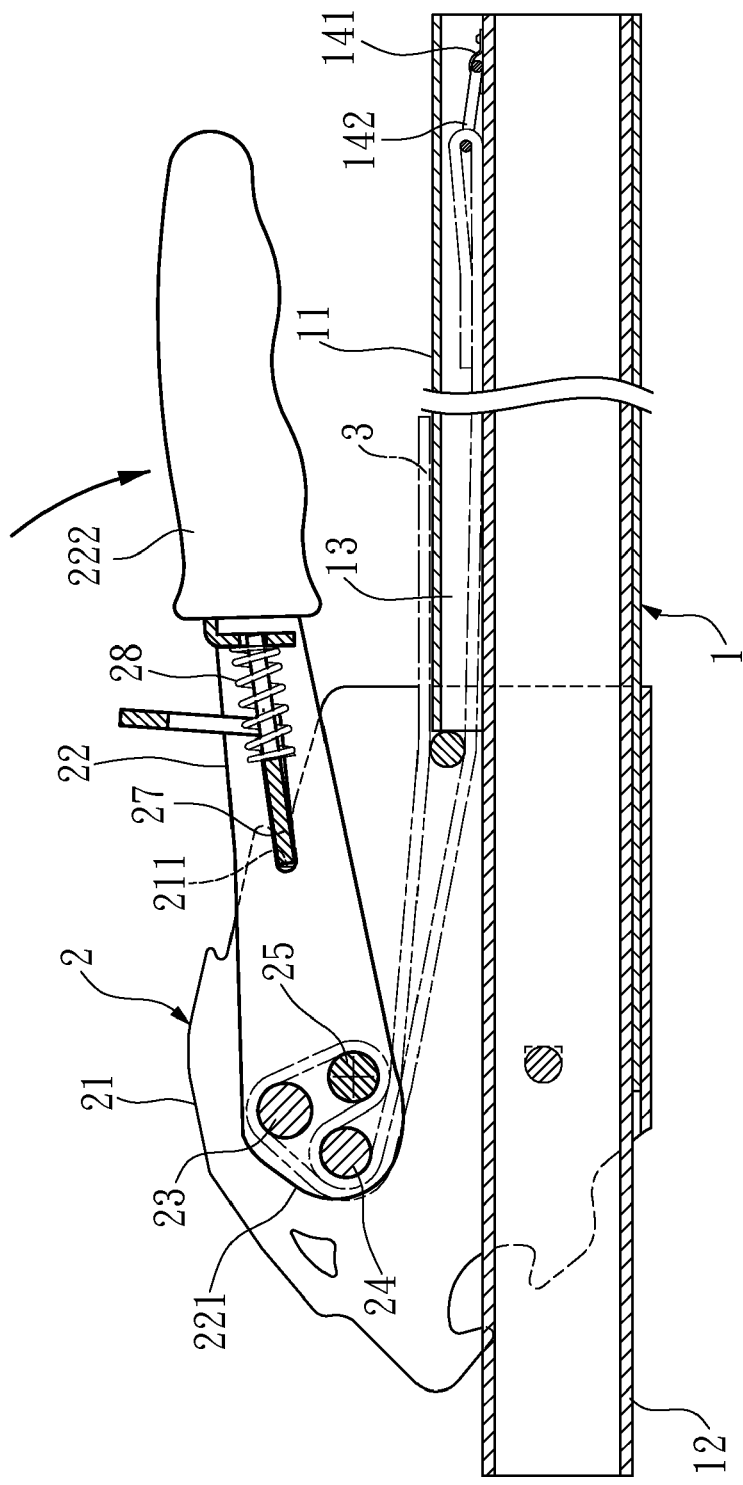
FIG. 10 is a schematic view of an application status, showing the status that a rotary arm is turned till a handle can be embedded into an embedding notch of a press-fit buckle in accordance with a fourth preferred embodiment of the present invention.

With reference to FIGS. 9 and 10 for a fourth preferred embodiment of the present invention, the difference between this embodiment and the aforementioned preferred embodiments resides on that the rotary arm 22 is pivotally coupled between two sidewalls 21 of he press-fit buckle device 2 by using the third operating portion 25 as an axis, such that if the rotary arm 22 has not been turned yet, then the rope 3 will not be fixed by the press-fit buckle device 2 as shown in FIG. 9, and a user can adjust the length of the inner pipe 12. If the user turns the rotary arm 22 to embed the handle 27 of the rotary arm 22 into the corresponding embedding notches 211 on both sides of the press-fit buckle device 2 to position the rotary arm 22 after the rotary arm 22 is turned, then the rope 3 can be pulled and turned around by the first operating portion 23 and the second operating portion 24 to form an overlap of the rope 3 in a press-fit state at a position adjacent to the second operating portion 24 and the third operating portion 25 as shown in FIG. 10 to achieve the same effect of the first preferred embodiment.

Figure 11:
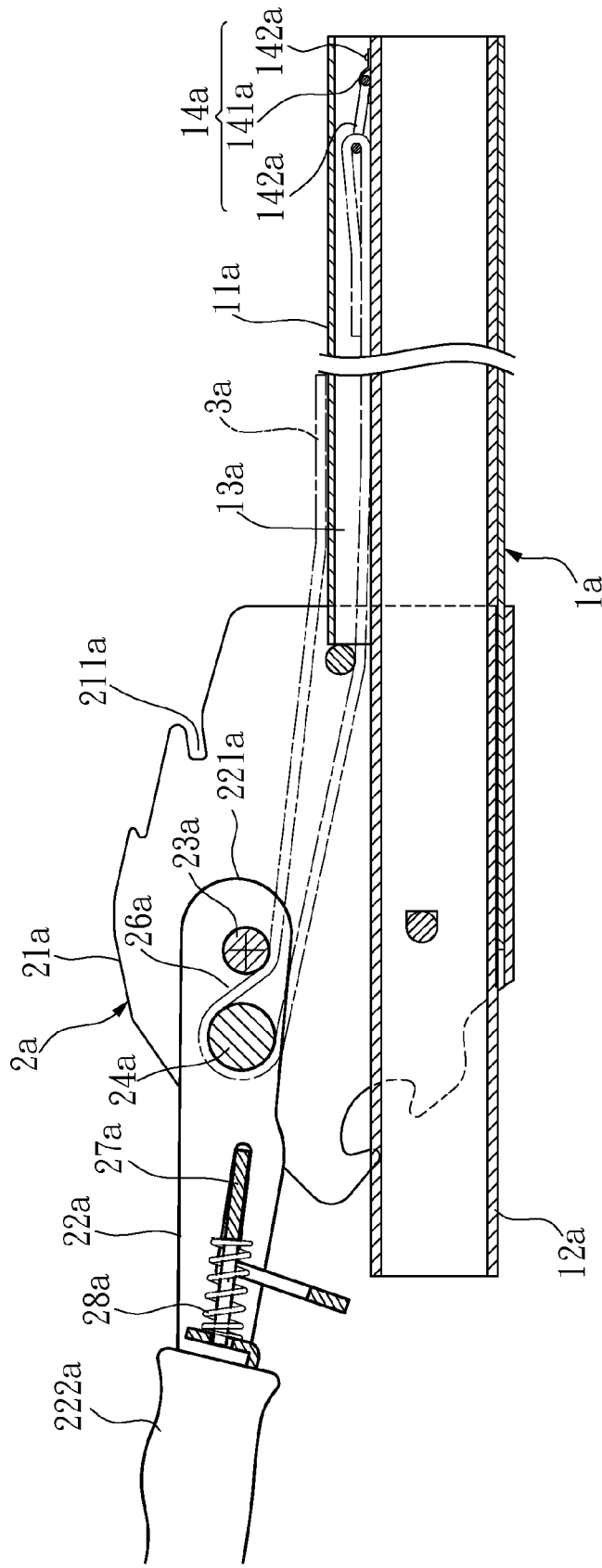
FIG. 11 is a schematic view of a structure, showing the status that a rotary arm has not been turned yet in accordance with a fifth preferred embodiment of the present invention.

With reference to FIG. 11 for a fifth preferred embodiment of in accordance with the present invention, this embodiment comprises a support rod 1a and a press-fit buckle device 2a.

The support rod 1a is composed of an outer pipe 11a, and an inner pipe 12a slidably sheathed along the outer pipe 11a, and a containing space 13a is formed between the outer pipe 11a and the inner pipe 12a, and the inner pipe 12a includes a fixing portion 14a disposed inside the containing space 13a, and the fixing portion 14a positions a fixing ring 142a by a fixing plate 141a and fixes the fixing plate 141a onto the inner pipe 12a by a plurality of screws 143a, and an end of a rope 3a is passed through and sewed at the fixing ring 142a at an external side of the inner pipe 12a, such that the end of the rope 3a can be fixed onto the fixing ring 142a, and another end of the rope 3a is passed through the containing space 13a and extended to an external side of the support rod 1a, and a supporting portion (not shown in the figure) is disposed individually at both ends of the support rod 1a.

The press-fit buckle device 2a is sheathed to a joint position of the outer pipe 11a and the inner pipe 12a, and the press-fit buckle device 2a includes two opposite sidewalls 21a, and a rotary arm 22a pivotally coupled between the two sidewalls 21a, wherein the rotary arm 22a includes a pivotal connecting end 221a and a turning end 222a disposed opposite to the pivotal connecting end 221a, and the pivotal connecting end 221a includes a first operating portion 23a and a second operating portion 24a, and the rotary arm 22a is pivotally coupled between the two sidewalls 21a by using the first operating portion 23a as an axis, and a gap 26a is formed between the first operating portion 23a and the second operating portion 24a, and another end of the rope 3a is wound onto the first operating portion 23a, and passed into the gap 26a between the first operating portion 23a and the second operating portion 24a.

The press-fit buckle device 2a further includes an embedding notch 211a disposed individually on two opposite sidewalls 21a, and a handle 27a slidably installed between the pivotal connecting end 221a and the turning end 222a of the rotary arm 22a, wherein the handle 27a is pushed by a resilient element 28a to be embedded into a corresponding embedding notch 211a disposed individually on two sidewalls 21a of the press-fit buckle device 2a for positioning the rotary arm 22a after the rotary arm 22a is turned.

With the fifth preferred embodiment of the present invention comprised of the aforementioned elements, the rope 3a has not been fixed by the press-fit buckle device 2a and the rotary arm 22a has not been turned as shown in FIG. 11, and thus a user can make an adjustment to the length of the inner pipe 12a.

Figure 12:
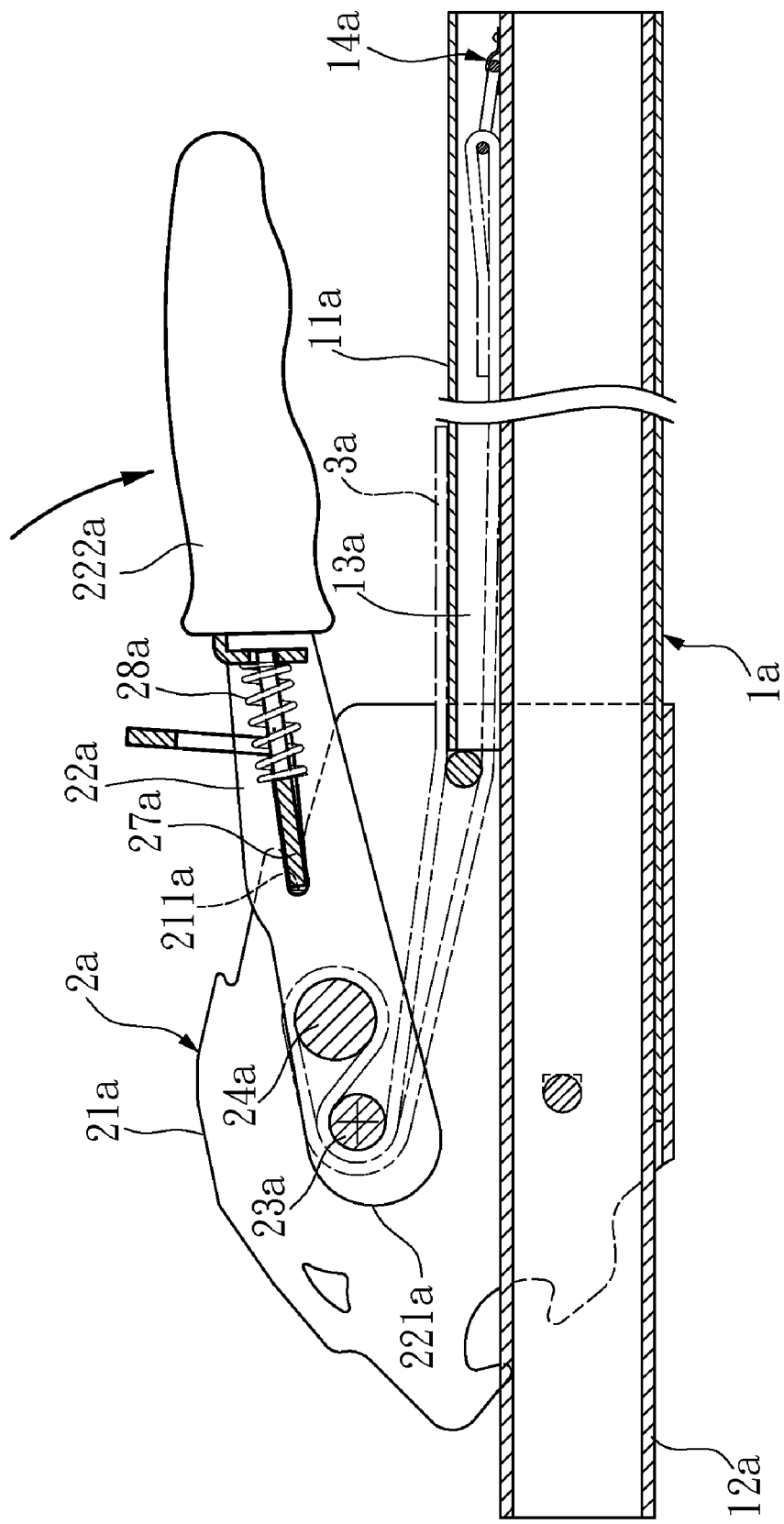
FIG. 12 is a schematic view of an application status, showing the status that a rotary arm is turned till a handle can be embedded into an embedding notch of a press-fit buckle in accordance with a fifth preferred embodiment of the present invention.
Figure 13:
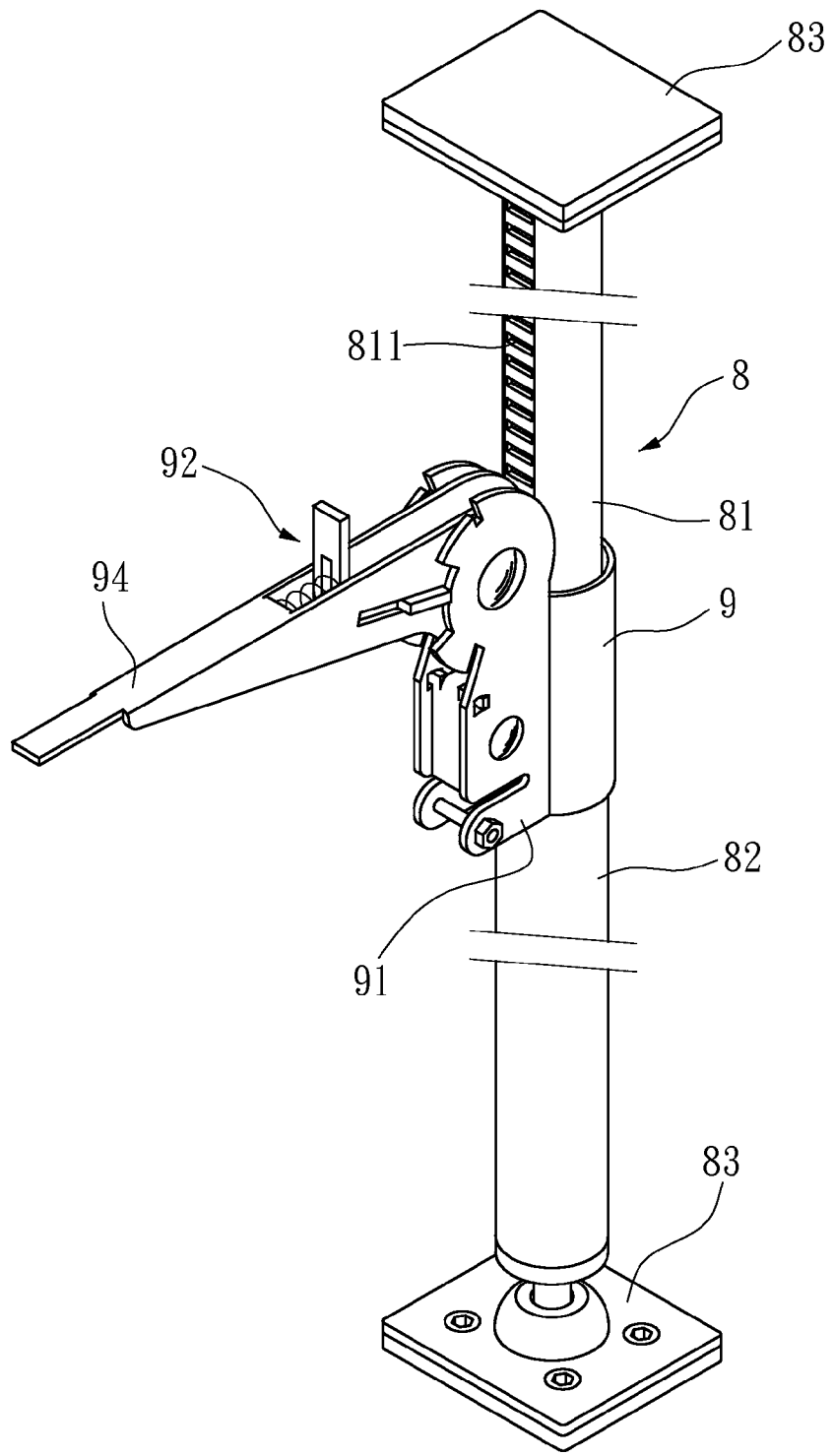
FIG. 13 is a schematic view of a conventional extendable support rod.
Figure 14:
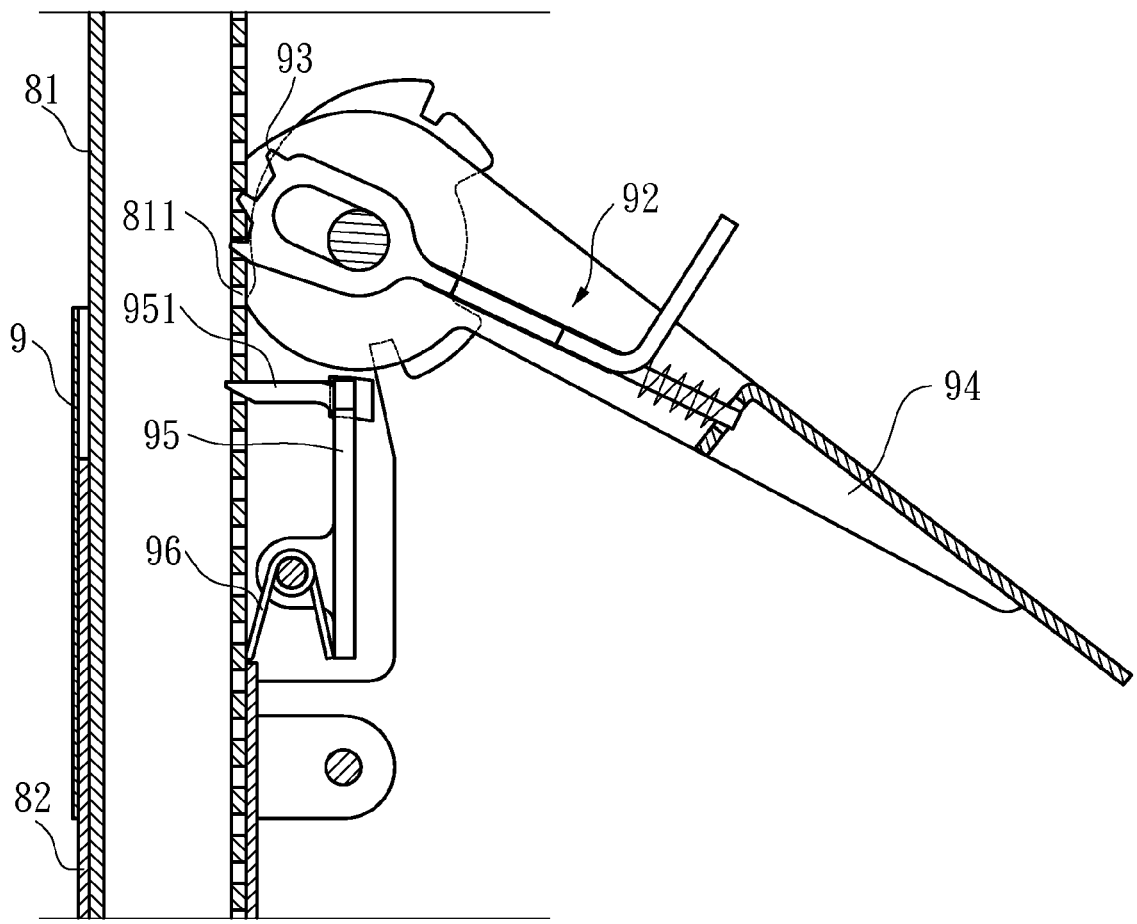
FIG. 14 is a cross-sectional view of a conventional extendable support rod.

If the user turns the rotary arm 22a to embed the handle 27a of the rotary arm 22a into the embedding notches 211a on both sides of the press-fit buckle device 2a to position the rotary arm 22a after the rotary arm 22a is turned as shown in FIG. 12, then the rope 3a can be pulled and turned around the first operating portion 23a and the second operating portion 24a to overlap the rope 3a in a press-fit state at a position adjacent to the second operating portion 24a, so as to fix the inner pipe 12a at a position with respect to the outer pipe 11a and achieve the same effect of the aforementioned preferred embodiments.

What is claimed is:

1. A press-fit extendable support rod, comprising:
a support rod, composed of an outer pipe and an inner pipe slidably sheathed along the outer pipe, and a containing space being formed between the outer pipe and the inner pipe, and the inner pipe having a fixing portion disposed inside the containing space, and a rope having an end fixed to the fixing portion and another end passed through the containing space and extended towards an external side of the support rod, and a supporting portion being disposed individually at both ends of the support rod;
a press-fit buckle device, sheathed to a joint position of the outer pipe and the inner pipe, and having two opposite sidewalls, and a rotary arm installed between the two sidewalls, and the rotary arm having a pivotal connecting end and a turning end disposed opposite to the pivotal connecting end, and the pivotal connecting end including a first operating portion, a second operating portion and a third operating portion, and the rotary arm being pivotally coupled between the two sidewalls by using one of the operating portions as an axis, and having a gap between the second operating portion and the third operating portion, and another end of the rope being wound onto the first operating portion and the second operating portion and then passed through the gap between the second operating portion and the third operating portion, such that when the rotary arm is turned, the rope is pulled, turned around, and pressed at each operating portion to fix the inner pipe at a corresponding position of the outer pipe.

2. The press-fit extendable support rod of claim 1, wherein the press-fit buckle device includes an embedding notch, and a handle installed between the pivotal connecting end and the turning end of the rotary arm and pushed by a resilient element to be embedded into an embedding notch of the press-fit buckle device, for fixing the rotary arm at a position after the rotary arm is turned.

3. The press-fit extendable support rod of claim 1, wherein the fixing portion is provided for positioning a fixing ring at a position by a fixing plate, and securing the fixing plate onto the inner pipe by a plurality of screws, and an end of the rope is passed through the fixing ring and sewed or fixed onto the fixing ring.

4. The press-fit extendable support rod of claim 1, wherein the outer pipe has a cross-section substantially in a circular shape, and the inner pipe has a cross-section substantially in a semicircular shape.

5. The press-fit extendable support rod of claim 1, wherein the outer pipe and the inner pipe have cross-sections substantially in a rectangular shape.

6. A press-fit extendable support rod, comprising:
a support rod, composed of an outer pipe and an inner pipe slidably sheathed along the outer pipe, and a containing space being formed between the outer pipe and the inner pipe, and the inner pipe having a fixing portion disposed inside the containing space, and a rope having an end fixed to the fixing portion and another end passed through the containing space and extended towards an external side of the support rod, and a supporting portion being disposed individually at both ends of the support rod;
a press-fit buckle device, sheathed to a joint position of the outer pipe and the inner pipe, and having two opposite sidewalls, and a rotary arm installed between the two sidewalls, and the rotary arm having a pivotal connecting end and a turning end disposed opposite to the pivotal connecting end, and the pivotal connecting end including a first operating portion and a second operating portion, and the rotary arm being pivotally coupled between the two sidewalls by using one of the operating portions as an axis, and having a gap between the first operating portion and the second operating portion, and another end of the rope being wound onto the first operating portion, and then passed through the gap between the first operating portion and the second operating portion, such that when the rotary arm is turned, the rope is pulled, turned around, and pressed at each operating portion to fix the inner pipe at a corresponding position of the outer pipe.

7. The press-fit extendable support rod of claim 6, wherein the press-fit buckle device includes an embedding notch, and a handle installed between the pivotal connecting end and the turning end of the rotary arm and pushed by a resilient element to be embedded into an embedding notch of the press-fit buckle device, for fixing the rotary arm at a position after the rotary arm is turned.

8. The press-fit extendable support rod of claim 6, wherein the fixing portion is provided for positioning a fixing ring by a fixing plate, and securing the fixing plate onto the inner pipe by a plurality of screws, and an end of the rope is passed through the fixing ring and sewed or fixed onto the fixing ring.

* * * * *